United States Patent
Halliday

(10) Patent No.: US 6,546,790 B1
(45) Date of Patent: Apr. 15, 2003

(54) METHOD AND APPARATUS FOR DIRECT MEASUREMENT OF AXIAL AXLE LOADS

(76) Inventor: Donald R. Halliday, 5312 Cascade Dr., Powell, OH (US) 43065

( * ) Notice: Subject to any disclaimer, the term of this patent is extended or adjusted under 35 U.S.C. 154(b) by 12 days.

(21) Appl. No.: 09/854,057

(22) Filed: May 11, 2001

(51) Int. Cl.[7] ............................................. G01M 17/02
(52) U.S. Cl. ...................................................... 73/146
(58) Field of Search ........................... 73/146, 862.041, 73/862.042, 862.043, 862.05, 862.541; 33/203.12, 203.13, 203.14, 203.15, 203.16, 203.17

(56) References Cited

U.S. PATENT DOCUMENTS

| | | | | |
|---|---|---|---|---|
| 3,828,614 | A | * 8/1974 | Borg | ............................. 74/16 |
| 4,371,191 | A | 2/1983 | Goldberg | |
| 4,691,792 | A | * 9/1987 | Shintani | ......................... 177/1 |
| 4,753,110 | A | * 6/1988 | Burchett et al. | .............. 73/146 |
| 5,186,042 | A | 2/1993 | Miyazaki | |
| 5,435,193 | A | * 7/1995 | Halliday | ...................... 280/521 |
| 5,821,434 | A | * 10/1998 | Halliday | ..................... 280/5.52 |
| 6,138,505 | A | * 10/2000 | Miyazaki | ...................... 73/146 |
| 6,256,894 | B1 | * 7/2001 | Naruse et al. | ........... 33/203.12 |

FOREIGN PATENT DOCUMENTS

DE 34 09 040 A1 9/1985

* cited by examiner

*Primary Examiner*—William Oen
(74) *Attorney, Agent, or Firm*—Mueller and Smith, LPA

(57) ABSTRACT

The axial or grip force between at least one wheel of a vehicle and a ground surface, wherein the wheel is mounted on an upright and carried by an axle, is directly measured. The axle is radially supported in the upright by roller bearings. The lateral load is supported by the use of thrust bearings. Disposed between the axle lateral thrust bearing assembly and the upright is a force sensor. The force sensor directly registers axial force on the axle with respect to the upright. Lateral (or axial) output force signals from the force sensor can be sent directly to a readout device or can be sent to a processor, for example, for treatment. Such a design results in isolating the axial or lateral force vector placed on the axle, which carries the wheel and tire assembly, and, thus, the directly measuring the grip force of the tire.

20 Claims, 2 Drawing Sheets

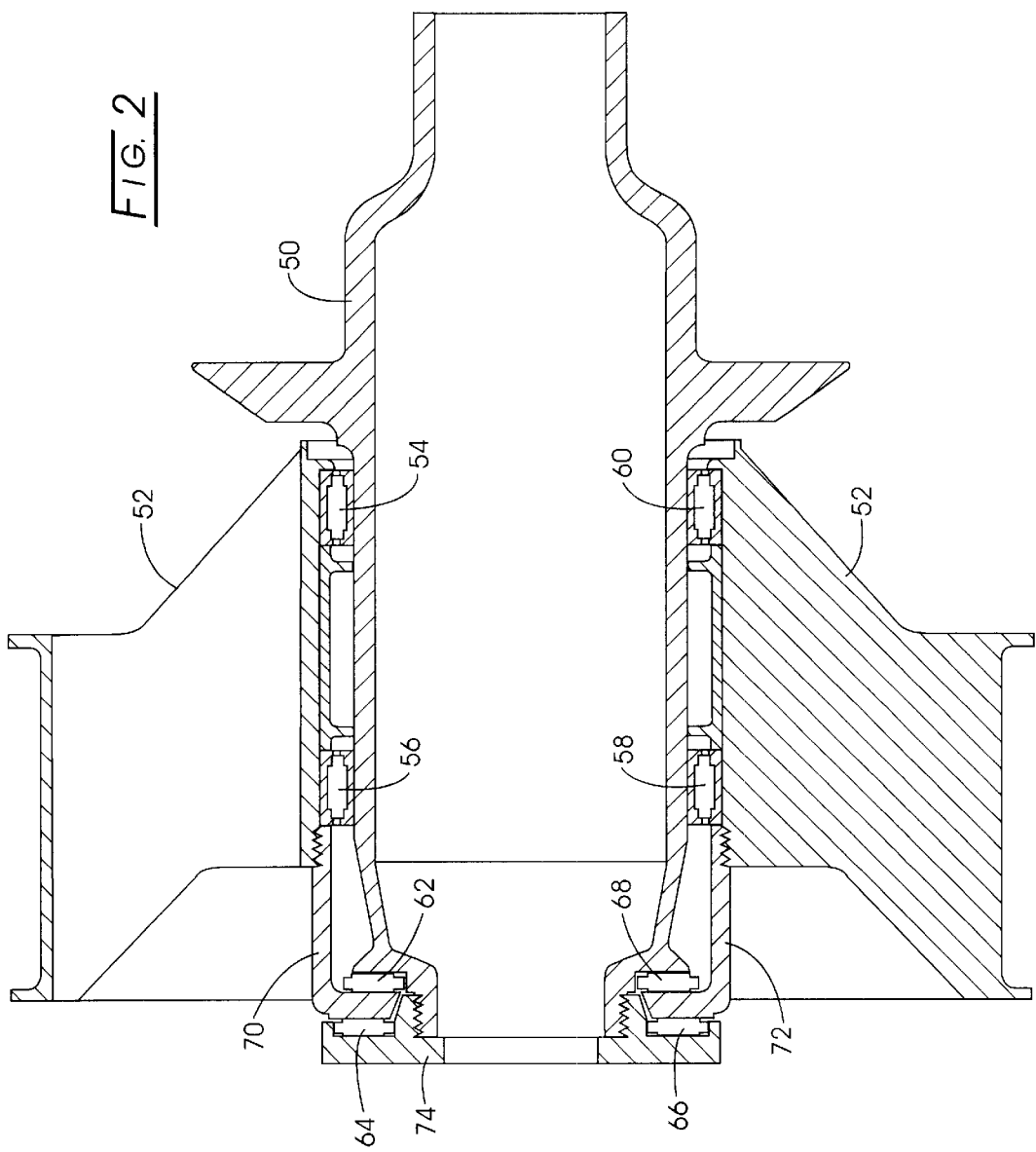

METHOD AND APPARATUS FOR DIRECT MEASUREMENT OF AXIAL AXLE LOADS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention generally relates to measuring the amount of lateral or axial force exerted on tires and more particularly to directly measuring such axial force in order to determine the grip performance of the car.

A variety of techniques have been proposed to measure the performance of vehicle, e.g., an automobile, a motorcycle, etc. One important parameter of vehicle performance is that of "grip". Grip is defined as the ability of a vehicle to maintain contact with the road surface during operation and is of particular importance when the vehicle is cornering. If the desired grip force exceeds the resistance afforded by the road surface, the tire will slide resulting in the vehicle deviating from its driver intended path. Such deviation can range from a nominal slippage of the car to triggering a catastrophic roll over with a variety of intermediate conditions ranging from spins to power slides.

Advantageous proposals aimed at measuring the grip performance of a vehicle (or more accurately, the grip performance of the tires of a vehicle) include U.S. Pat. Nos. 5,435,193 and 5,821,434. These proposals isolate the uprights from the axle and associate a force sensing system therebetween. The force sensing system now can experience the loads placed on the tires without interfering with the operation of the vehicle's suspension system. A processor can resolve the measuring loads into an axial and a radial component with the axial component being desired for grip performance analysis. Such system functions whether the vehicle is traveling in a straight line or around corners at low speed or at high speed. This system is especially useful in racing contexts.

Other proposals include Miyazaki (U.S. Pat. No. 5,186,042) who proposes a device for measuring the action force of a wheel, which device comprises a stress detection sensor mounted in a hole provided in a vehicle axle, and a signal processing circuit to process a detection signal from the stress detection sensor. Miyazaki teaches that as the stress detection sensor is embedded in the axle, interferences to the sensor output signal from wheel action forces other than the "target" wheel action force may be decreased.

Goldberg (U.S. Pat. No. 4,371,191) proposes to adjust an automobile suspension system that is responsive to sensed attitude and force changes to change the wheel camber in order to optimize tire contact with the road surface. Goldberg contemplates a system that monitors the forces acting on the vehicle, the direction and degree that the steering wheel is tuned, the relative height of each wheel to the vehicle body, the rotational speed of each wheel, and the camber of each wheel with respect to the vehicle body. A processor coordinates any sensed variations in the vehicle due to changes in the monitored variables, and, in turn, sends out signals to cause an adjustment to be made in the wheel effected.

DE 34 09 040.1 is designed only to determine the lateral force exerted on a wheel (or tire) of a vehicle. Such measurement is achieved while the vehicle is traversing a straight track. Forces due to curves, sloping roadways, wind, and the like, should be subtracted from the simple lateral force exerted by the wheel on the vehicle chassis according to this patent.

Lacking in these proposals is the ability to directly measure only the axial forces exerted on vehicle tires without having to resolve complex forces into component vectors, whether the vehicle is traveling slow, fast, in a straight line, around corners, on flat roadways, or on hilly roadways. It is to such a system that the present invention is directed.

BRIEF SUMMARY OF THE INVENTION

The present invention is an alternative implementation of the load isolation technology disclosed in U.S. Pat. Nos. 5,435,193 and 5,821,434. To that end, the axial or grip force between at least one wheel of a vehicle and a ground surface, wherein the wheel is mounted on an upright and carried by an axle, is directly measured. The axle is radially supported in the upright by roller bearings. The lateral load is supported by the use of thrust bearings. Disposed between the axle lateral thrust bearing assembly and the upright is a force sensor. The force sensor directly registers axial force on the axle with respect to the upright, which is attached to the vehicle chassis. Axial (or lateral) output force signals from the force sensor can be sent directly to a readout device or can be sent to a processor, for example, for treatment. Such a design results in isolating the lateral or axial force vector placed on the axle, which carries the wheel and tire assembly, and, thus, the directly measuring the grip force of the tire.

Advantages of the present invention include the ability to reduce the inside diameter area of upright assemblies and increase available airflow through the upright in some vehicle designs. Another advantage is the potential weight reduction (about 2–3 pounds per axle) of the inventive system compared to prior grip force measurement systems because of the smaller radial load carrying bearings used in the inventive system. A further advantage is that "grip" force is measured with a single load cell output by introduction of a roller bearing assembly, which allows axial mechanical freedom. These and other advantages will be readily apparent based upon the disclosure set forth herein.

BRIEF DESCRIPTION OF THE DRAWINGS

For a fuller understanding of the nature and advantages of the present invention, reference should be had to the following detailed description taken in connection with the accompanying drawings, in which:

FIG. 2 is a simplified cross-sectional view of an alternative embodiment of a typical undriven axle and upright assembly fitted with the axial grip measurement system of this invention.

Figure 1:
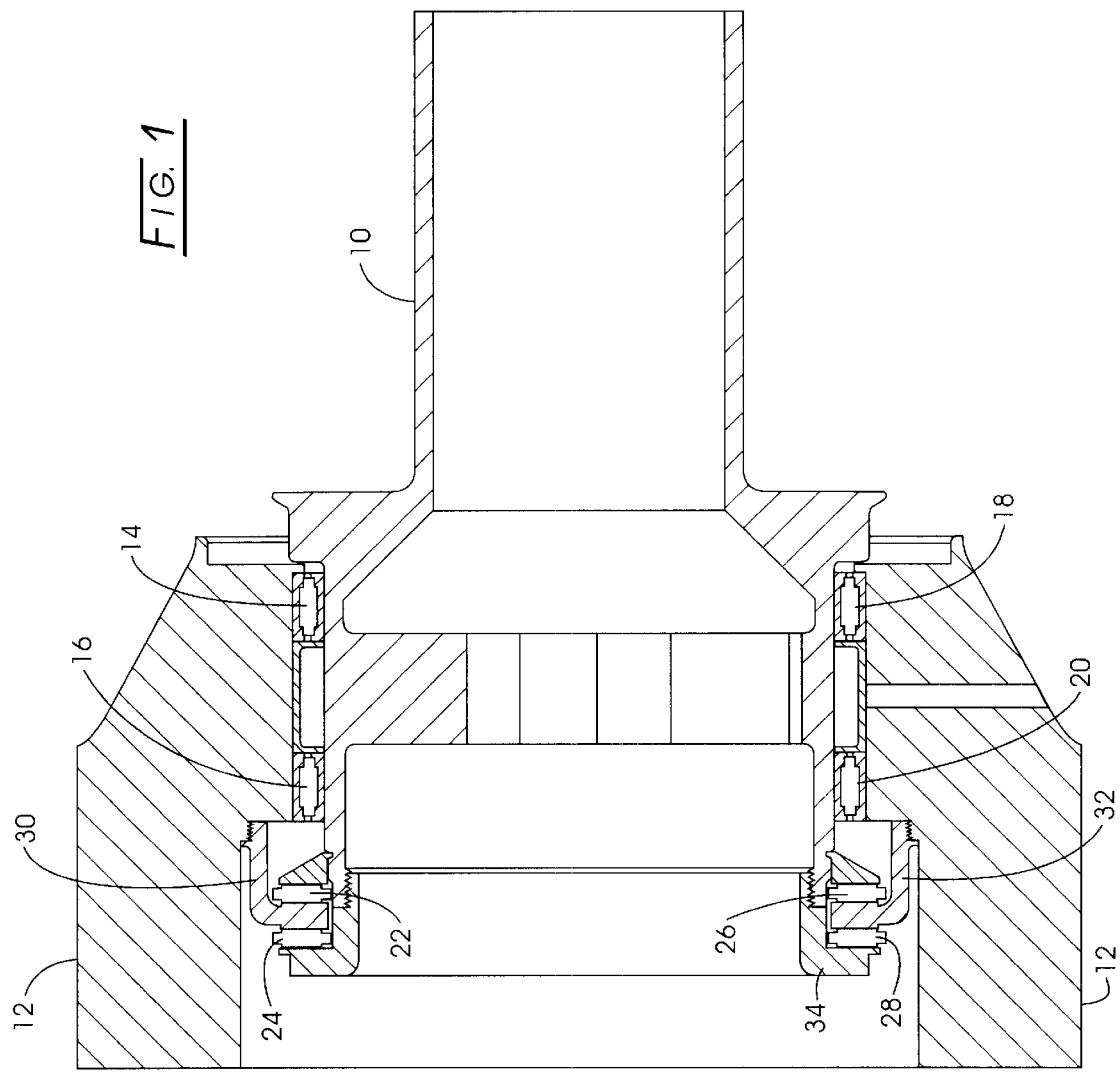
FIG. 1 is a simplified cross-sectional view of one embodiment of a typical driven axle and upright assembly fitted with the axial grip measurement system of this invention.

The drawings will be described in detail below.

DETAILED DESCRIPTION OF THE INVENTION

While knowing all of the force vectors to which a wheel assembly is subjected during travel of a vehicle, and especially a racecar, as taught in U.S. Pat. Nos. 5,435,193 and 5,821,434, is valuable, on occasion only the axial force vector or component is required. Also, in some vehicle use situations, weight is of overriding importance. Formula 1 (F1) is an example where constructors try to reduce the weight of the racecar. A reduction of just a few pounds is important to the constructor. In general, weight reduction is important in all racecar situations from CART (Championship Auto Racing Teams), to Indy car racing, to road racing. Even common passenger vehicles will benefit from weight reduction improved fuel economy. Weight reduction of the inventive grip measurement system compared to the system in U.S. Pat. Nos. 5,435,193 and 5,821,434, thus, is an important benefit of the present design. CART (Championship Auto Racing Teams), to Indy car racing, to road racing. Even common passenger vehicles will benefit from weight reduction improved fuel economy. Weight reduction of the inventive grip measurement system compared to the system in U.S. Pat. Nos. 5,435,193 and 5,821,434, thus, is an important benefit of the present design.

The inventive design also should permit F1 upright annular area to be increased, which translates into less weight and increased available airflow through the upright. The inventive grip measurement system also is around 2–3 pounds per wheel lighter in weight than the GEM™ device manufactured under U.S. Pat. Nos. 5,435,193 and 5,821,434.

Referring initially to FIG. 1, driven axle, 10, will be seen to be carried in an upright, 12. Not shown is the wheel and tire assembly that can be mounted to axle 10. In order to isolate axial and radial forces exerted on axle 10, axle 10 is supported in upright 12 by a radial bearing assembly composed of radial load bearings, 14, 16, 18, and 20 (and, optionally, others not shown). The number of radial load bearings, which may be one or more, in the radial load bearing assembly is determined based other factors by the automotive engineer and constructor. Of importance is that axle 10 now has a degree of freedom in the axial (lateral) direction while concomitantly the radial load bearings 14, 16, 18, and 20, absorb radial load exerted upon/by axle 10.

Next, a thrust bearing assembly composed of thrust bearing pairs, 22 and 24, and 26 and 28, (and, optionally, other bearings or bearing pairs, not shown) are associated with an end of axle 10 and absorb axial forces exerted by/upon axle 10. A lip, 34, on the inboard end of axle 10 serves to retain thrust bearing pairs 22/24 and 26/28. Disposed between each thrust bearing pair and upright 12 is a force sensor, 30 for bearing pair 22/24 and 32 for bearing pair 26/28, which force sensors determine the axial forces being exerted by/upon axle 10 relative to upright 12. Again, the number of thrust bearings used in the thrust bearing assembly can be one or more with the number and location determined based other factors by the automotive engineer and constructor.

It will be noted that the described and illustrated design has mechanically isolated the radial and axial forces exerted by/upon axle 10. By so doing, it now is possible to directly measure the axial or grip forces being exerted upon the tires of the vehicle without having to resolve force vectors in other supporting structures. Moreover, this design is independent of caster, camber, and toe-in of the wheels, independent of terrain traversed by the vehicle, independent of vehicle speed, and independent of other variables associated with the vehicle and its environment.

FIG. 2 shows an alternative embodiment of the invention wherein an undriven axle, 50, is carried in an upright, 52. Upright 52 and axle 50 are separated by radial bearings, 54, 56, 58, and 60 (and, optionally, other bearing pairs not shown). Again, the number of radial load bearings is determined by other factors by the automotive engineer and constructor. Of importance is that axle 50 now has a degree of freedom in the axial (lateral) direction while concomitantly the radial load bearings 54, 56, 58, and 60, absorb radial load exerted upon/by axle 50.

Again, the outboard end of axle 50 carriers thrust bearing pairs, 62/64 and 66/68. Disposed between these bearing pairs, respectively, are force sensors 70 and 72. A cap, 74, attaches to the outboard end of axle 50 and serves to retain these thrust bearing/force sensor assemblies in place.

Regardless of the configuration of the assembly, the output of the force sensors can be sent directly to a readout device installed on board the vehicle or can be transmitted by telemetry to a central station. The viewer of the readout device can instantaneously determine the amount of grip force exerted on the tires during performance of maneuvers by the vehicle operator. The vehicle operator can alter speed, angle of entry into a turn, rate of acceleration/deceleration, etc., to see whether the grip force of the tire is increased or decreased. Such knowledge can be translated into safer cornering, extended tread wear of tires, improved lap speeds/time, and the like. The tire engineer can readily visualize tire design effect on grip force also to aid in tire design and manufacturing. The same is true for vehicle set up, including, for example, shock/spring stiffness, adjust of wheels (e.g., caster/camber/toe-in), etc.

Alternatively, the output of the force sensors (e.g., of the strain gauge or load cell type) also can be sent to a processor for recording and/or processing of such signals according to some algorithm appropriate for the data being collected. In this regard, additional force sensors may be used, such as described, for example, in U.S. Pat. Nos. 5,435,193 and 5,821,434, and additional data collected, collated, and processed along with the data collected from the invention.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

I claim:

1. Method for directly determining the axial force between at least one wheel of a vehicle and a ground surface in contact with said wheel, wherein the wheel is mounted on an upright connected to a vehicle chassis and carried by an axle, which comprises the steps of:

(a) spacing the upright and the axle apart;

(b) disposing a load bearing assembly between said upright and said axle to allow axial mechanical freedom;

(c) associating an axial thrust bearing assembly with said axle; and (d) disposing a force sensor assembly between said axle thrust bearing assembly and said upright;

whereby said force sensor assembly directly registers axial force on the axle with respect to the upright.

2. The method of claim 1, wherein output signals from said force sensor assembly are sent to one or more of a readout device or a processor.

3. The method of claim 1, wherein said force sensor assembly is of one or more of a strain gage or a load cell.

4. The method of claim 1, wherein said radial load bearing assembly comprises a plurality of roller bearing assemblies which are disposed between said upright and said axle.

5. The method of claim 1, wherein a plurality of thrust bearings are associated with said axle.

6. The method of claim 4, wherein a plurality of thrust bearings are associated with said axle.

7. The method of claim 1, wherein said thrust bearing assembly retained against said axle by a cap.

8. The method of claim 1, wherein an end of said axle retains a lip that retains said thrust bearing assembly.

9. The method of claim 1, wherein said vehicle has 2 wheels or 4 wheels, each of which is subject to said method.

10. The method of claim 1, wherein said vehicle is one or more of a motorcycle, a racecar, or a road car.

11. A system for directly determining the axial force between at least one wheel of a vehicle and a ground surface in contact with said wheel, wherein the wheel is mounted on an upright connected to a vehicle chassis and carried by an axle, which comprises:

(a) the axle being supported within an upright;

(b) a bearing assembly being disposed between said upright and said axle to allow axial mechanical freedom;

(c) a thrust bearing assembly being associated with said axle; and (d) a force sensor assembly being disposed between said axle thrust bearing assembly and said upright;

whereby said force sensor assembly directly registers axial force on the axle with respect to the upright.

12. The system of claim 11, wherein output signals from said force sensor assembly are sent to one or more of a readout device or a processor.

13. The system of claim 11, wherein said force sensor assembly is of one or more of a strain gage or a load cell.

14. The system of claim 11, wherein said radial load bearing assembly comprises a plurality of roller bearing assemblies which are disposed between said upright and said axle.

15. The system of claim 11, wherein a plurality of thrust bearings are associated with said axle.

16. The system of claim 14, wherein a plurality of thrust bearings are associated with said axle.

17. The system of claim 11, wherein said thrust bearing assembly retained against said axle by a cap.

18. The system of claim 11, wherein an end of said axle retains a lip that retains said thrust bearing assembly.

19. The system of claim 11, wherein said vehicle has 2 wheels or 4 wheels, each of which is subject to said method.

20. The system of claim 11, wherein said vehicle is one or more of a motorcycle, a racecar, or a road car.

* * * * *